March 22, 1938.  L. D. MILES  2,112,040
DEMOUNTABLE ELECTRODE ASSEMBLY
Filed March 21, 1936   2 Sheets-Sheet 1

Inventor:
Lawrence D. Miles,
by Harry E. Dunham
His Attorney.

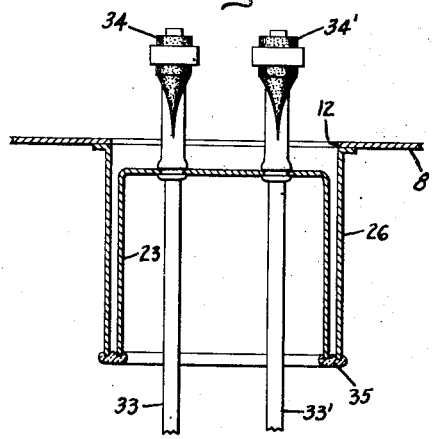
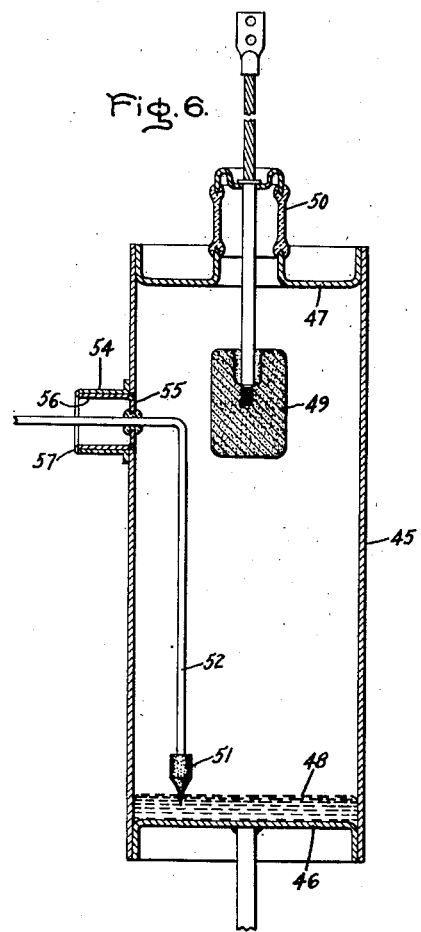
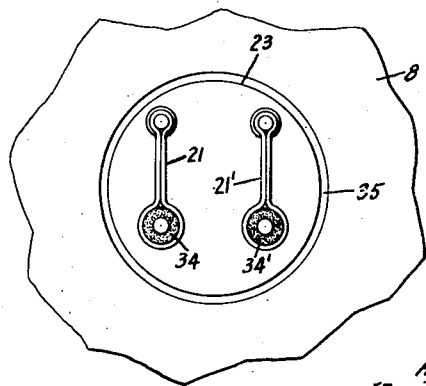
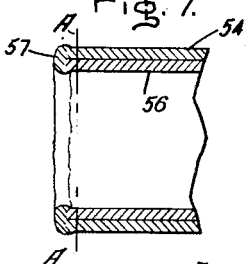
Inventor:
Lawrence D. Miles,
by Harry E. Dunham
His Attorney.

Patented Mar. 22, 1938

2,112,040

UNITED STATES PATENT OFFICE 2,112,040

DEMOUNTABLE ELECTRODE ASSEMBLY

Lawrence D. Miles, Schenectady, N. Y., assignor to General Electric Company, a corporation of New York Application March 21, 1936, Serial No. 70,087

10 Claims. (Cl. 250—27.5)

The present invention relates to electric discharge devices, and more particularly to a demountable electrode assembly for such devices.

Mercury pool rectifiers and inverters of the type adapted to be controllably refired at each current cycle conventionally embody a special starting electrode mounted in permanent contact with the mercury surface. With this arrangement the conditions of operation are such that the starting electrode is apt to be rendered unfit for further use considerably before the remaining parts of the tube become inoperative. Nevertheless, since the starting electrode is a particularly vital element, the whole tube may have to be discarded because of this one defect, unless it is remedied by replacement or repair of the faulty part. It is an object of my present invention to produce an improved tube assembly whereby a defective electrode may be replaced and the whole tube reconditioned for use by means of an extremely simple and easily repeated factory operation.

To this end I provide in connection with the portion of the envelope wall on which the electrode is mounted, an exteriorly exposed septum or fillet of glass which when fractured or softened by heat, permits access to the worn-out electrode without requiring the remainder of the tube assembly to be modified in any way.

Alternatively, I may provide a removable envelope closure comprising an externally accessible severable metal portion having its parts so formed as to facilitate reclosure by an easily practiced welding operation.

Figure 1:
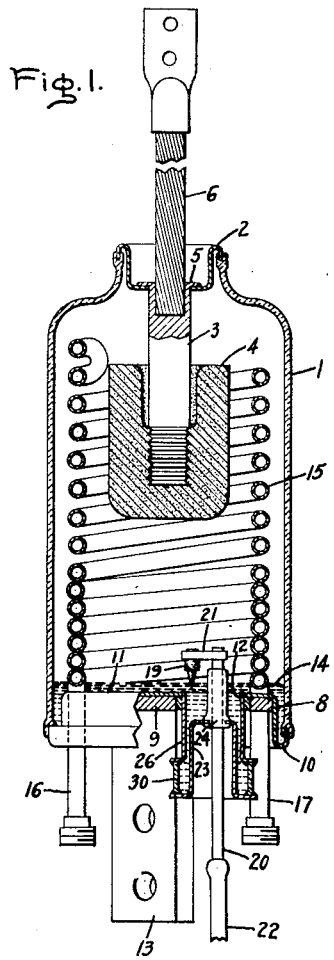
Figure 2:
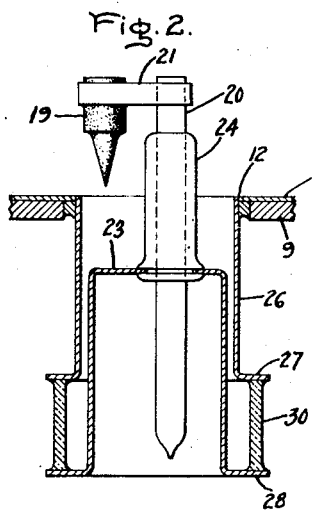
Figure 5:
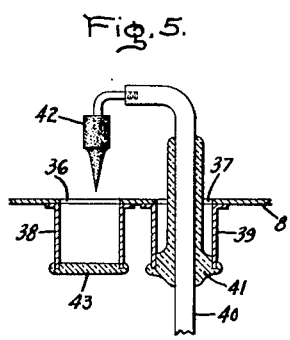

The features of my invention which I consider to be novel are pointed out with particularity in the appended claims. The invention itself, however, together with additional objects and advantages thereof, will best be understood by reference to the following specification and the accompanying drawings, in which Fig. 1 illustrates in section a complete pool-type discharge device embodying my invention; Fig. 2 is an enlarged sectional view illustrating in detail my improved electrode assembly; Figs. 3 and 4 are fragmentary sectional views of one alternative modification of the assembly; Fig. 5 is a sectional view illustrating a different mode of application of the invention, and Figs. 6 and 7 are assembly and detailed views, respectively, of a third alternative embodiment thereof.

Referring particularly to Fig. 1, I have shown an evacuated sealed envelope 1 comprising an elongated cylinder closed at the top and bottom in a manner to be explained more fully hereinafter. While in this particular case I have illustrated the major portion of the envelope walls as consisting of glass, it will be understood that they may alternatively be constituted of metal with the interposition of one or more sections of glass to insulate the metal parts intended to be maintained at different potentials.

The upper end of the envelope 1 comprises a portion of reduced diameter closed by a metal cap 2 having a reentrant projection toward the interior of the envelope. It should be noted that the cap 2, as well as all other metal portions hereinafter referred to as being sealed directly to glass, may appropriately consist of one of the various alloys described in an article by Dr. A. W. Hull and E. E. Burger appearing in vol. 5 of the magazine "Physics" for December, 1934. A particular example described in the article comprises an alloy of 54 per cent iron; 28 per cent nickel, and 18 per cent cobalt, which is shown to have expansion characteristics almost identical with those of a standard hard glass (Corning G—71). This alloy is now generally referred to as comprising "Fernico" metal.

The cap 2 is provided with a central aperture which is used for the introduction of a heavy steel rod 3 adapted to support and supply current to an anode 4 preferably of graphite. An outwardly extending flange 5 is provided at the upper end of the rod 3 and is hermetically sealed to the outer surface of the cap 2 by projection welding or by some equivalent method. A direct connection to an external source of potential may be made through the heavy stranded conductor 6 which is silver soldered, or otherwise suitably secured in a hole provided for that purpose in the top of the rod 3.

The lower end of the glass cylinder 1 is closed by a metal header 8 peripherally sealed to the edge of the glass. In order to prevent cracking of the seal due to the contraction and expansion of the header, a reentrant bend 10 is provided near the outer edge of the latter which imparts considerable flexibility to the structure. The header as a whole thus includes a flattened upper surface having therein a circular aperture 12, together with an electrode mounting structure to be hereinafter more fully described.

To avoid flexure of the metal wall surface due to the considerable pressure differential existing between the outside and the inside of the envelope, the header is provided externally with a reinforcing plate 9 of steel or a similar material of good mechanical strength. An attachment lug 13, comprising a solid block of readily conducting metal such as copper, is brazed to the plate 9 to afford a convenient means of connecting the header to a suitable source of potential.

Within the envelope the surface of the header 8 is entirely or substantially covered by a quantity of mercury 14 adapted to serve as a pool-type cathode and as a source of mercury vapor during operation of the tube. The vapor pressure of the mercury is maintained within desired limits during the operating period by a cooling coil 15 comprising a double spiral of steel pipe surrounding the entire discharge path from the surface of the cathode up to and around the anode. Water or other suitable cooling fluid is supplied to the cooling coil by inlet and outlet conduits 16 and 17, respectively, which project through the bottom of the header 8.

During operation, starting of the discharge is controlled at each cycle by an auxiliary electrode 19 mounted in permanent contact with the surface of the mercury. This electrode may suitably comprise a tapered cylindrical rod of a semi-conducting material such as the carbide of boron, silicon or tungsten, or a mixture of one or more of these materials with an insulating diluent such as clay. A highly satisfactory type of starting electrode is described and claimed in application, Serial No. 48,864, filed November 8, 1935, John M. Gage, and assigned to the assignee of the present application. The material therein disclosed comprises a core of silicon carbide having on the tip portion thereof a coating of mixed boron carbide and clay.

In accordance with my present invention the starting electrode 19 is rigidly supported in cooperative relation with the mercury cathode by a conductor 20 preferably comprising a hollow open-ended tube, suitably of "Fernico" metal, as best shown in Fig. 2. The electrode 19 is mechanically and electrically connected to this latter element by a metallic connector 21 which is assured of good contact with the electrode by being sprayed with another metal such a molybdenum.

The hollow conductor 20 is provided intermediate its ends with a skirt-like attachment or thimble 23 to which it is insulatingly joined by a sleeve of glass 24 fused both to the thimble and to the conductor. The sleeve 24 is of such length that it maintains the conductor 20 insulated, not only from the thimble 23, but also from the mercury pool 14.

Due to the high thermal conductivity of the header 8 in combination with the backing plate 9, it is difficult to fuse glass directly to the edges of the aperture 12. For this reason I provide a depending cylinder 26 welded or otherwise joined to the header 8 in a region surrounding the aperture. In the embodiment illustrated in Fig. 2 this is provided at its lower end with an outwardly extending flange 27 adapted to cooperate with a corresponding flange 28 provided at the outer end of the thimble 23.

In the manufacture of the tube the electrode 19 may be positioned after the assembly of the discharge device is otherwise complete by arranging the thimble 23 so that its closed end projects into the cylinder 26 in the manner shown. A closure member or fillet of glass 30 is then interposed between the flanges 27 and 28 and hermetically sealed to each flange by the application of heat. During this operation the glass sleeve 24 is adequately shielded from the sealing flame by the reentrant configuration of the thimble 23.

After the tube is completely assembled as illustrated in Fig. 1, the electrode 19 being adjusted to the desired extent of contact with the mercury pool, the device may be exhausted by connecting the lower extremity of the hollow tube 20 to a vacuum pump connection 22. Thereafter the sealing of the tube is completed by pinch-welding the lower end of the tube 20 as illustrated in Fig. 2.

In accordance with my invention, in case the electrode 19 becomes ineffective before the remaining elements of the tube are substantially impaired, it may readily be removed and replaced by the following procedure. The glass fillet 30 may be fractured by striking with some hard object and the entire electrode assembly withdrawn by dropping out the thimble 23. Thereafter the adhering fragments of glass may be melted off and a completely new electrode assembly sealed in place. Since each electrode assembly may include a hollow conductor as a means for re-exhausting the envelope, this renovation can be accomplished without modifying any other part of the structure.

The advantages of the mounting assembly above described are not limited to its use with a single starting electrode. For example, in Figs. 3 and 4 I have shown a slightly modified arrangement which provides for mounting more than one electrode piece. As before, the header 8 is provided with an aperture 12 and a depending cylinder 26 surrounding the same. A thimble 23, similar to that previously described except for the omission of the lower flange, is arranged to project upwardly into the cylinder 26. Two conductors 33 and 33' pass through the closed end of the thimble 23, being insulatingly joined thereto by a glass-to-metal seal of the type already described. These conductors are connected, respectively, to identical starting electrodes 34 and 34' which may be used to place the discharge device under the concurrent control of two independent starting circuits, or alternatively may be used one at a time to increase the period which may elapse without replacement of parts. In this embodiment the thimble 23 and the cylinder 26 are joined by bringing their lower edges into juxtaposition and sealing the gap between them with a ring or fillet of glass 35 fused into place. When replacement is desired, this fillet may be broken out as previously explained, and a new electrode assembly slipped into place.

It will be understood, of course, that the particular illustrations which I have given are exemplary and not limiting. Thus, it is possible, and my invention contemplates, that a similar assembly may be used for supporting more than two electrodes, or even parts, other than electrodes, which may be required to be replaced from time to time. For example, the removable thimble may be used as a base for a permanently installed vacuum gauge of the type which depends on variation in current flow between a pair of adjacently mounted discharge electrodes to indicate changes in the pressure of the contained gaseous medium.

In Fig. 5 I have shown a further modification of the invention comprising a slightly different arrangement of elements. In this modification the metal header 8 is provided with two apertures 36 and 37, each surrounded by a depending cylinder 38 and 39 respectively. An electrode supporting conductor 40 passes axially through the cylinder 39 and the aperture 37 and is sealed in place by a body of glass 41. A starting electrode 42 is joined to a depending projection of the conductor 40 by being screw-threaded on to the same in such a way as to be readily removable.

The lower end of the cylinder 38, which lies directly under the electrode 42, is sealed by a frangible closure or septum of glass 43. In this case, when it is desired to remove the electrode 42, the septum 43 is broken, the electrode unscrewed from its support, a new electrode mounted in place, and the glass closure once more completed.

In its broadest aspect the use of an outwardly projecting cylinder and a conformed interfitting closure cap is capable of a still further adaption which I have illustrated in Figs. 6 and 7. The tube there shown comprises a cylindrical metal envelope 45 closed at the top and bottom by disc-like headers 46 and 47 respectively. In this case, the cathode consists of a mercury pool 48 in direct contact with the envelope wall, while the anode 49 is insulated from the envelope by a glass ring 50. A starting electrode 51 is suspended in permanent contact with the mercury pool by a rigid conductor 52.

In accordance with my invention, the starting electrode mounting includes an outwardly projecting hollow metal member or cylinder 54 encircling an aperture of desired size in the envelope wall. To close this aperture, I provide a cap or thimble 55 having a skirt or flange 56 which fits tightly into the cylinder 54. By disposing these parts so that their edges are conforming and contiguous, I am enabled to fuse them together by atomic hydrogen welding to produce a completely external seal 57 as shown in Fig. 7.

When, after a period of operation, it is desired to remove the electrode 51, the lead-in connection for which is sealed through the cap 55, the union between the concentric cylinders may be destroyed by filing or sawing off their ends for instance along the line A—A of Fig. 7. After such severance it is a simple matter to take out the cap 55 and to repair the damaged electrode. Thereafter the cap may be replaced and a new seal completed by rewelding the conforming edges of the thimble and cylinder.

I consider the various forms of removable closure described in the foregoing to be capable of wide application with the many new types of all-metal tubes now being introduced into commercial use. It is particularly contemplated that such closures may be employed in various arrangements other than those herein described either with or without an attached electrode assembly as a convenient means of gaining access to a sealed metal envelope. In this connection, the closure aperture may be made sufficiently large to permit an operator to manipulate elements contained within the envelope without requiring its complete disassembly.

While I have described certain of the parts of my improved constructions as being characteristically of "cylindrical" shape, it is obvious that this shape is not essential for such parts. It will accordingly be understood that in using this term in the appended claims, I intend thereby to cover variant forms as well.

What I claim as new and desire to secure by Letters Patent of the United States, is:—

1. An electric discharge device comprising a cylindrical envelope, an anode mounted at the top of the envelope, a metal header peripherally sealed to the bottom of said envelope, a pool-type cathode comprising a quantity of cathode material in contact with said header, a starting electrode supported in permanent contact with the cathode material, a conductor passing through said header for supporting and energizing said starting electrode, and an exteriorly exposed frangible closure member comprising a portion of the wall of said header in the region of said starting electrode, said starting electrode being accessible for removal from the envelope upon breakage of said closure member.

2. An electric discharge device comprising a sealed envelope, an anode supported at the top of said envelope, a metal header peripherally sealed to the bottom of said envelope, a pool of mercury in contact with said header, a starting electrode supported in proximity to said pool, and means for supporting said starting electrode, said means including a hollow tube having an open end extending into the envelope for supportingly engaging the starting electrode, and a sealed-off end projecting outwardly through said header, an intermediate skirt-like member attached to said tube between the ends thereof and a gas-tight connection between said member and said header comprising an exteriorly exposed fillet of readily frangible thermoplastic material.

3. An electric discharge device comprising a sealed envelope, an anode supported within said envelope, an apertured metal header closing the bottom of said envelope, a pool-type cathode comprising a quantity of cathode material in contact with said header, a rigid conductor passing through said header and insulated from said cathode material, a starting electrode detachably connected to said conductor and supported thereby in continuous contact with said cathode material above said header aperture, a hollow metal cylinder depending from said header and joined thereto in a region surrounding said aperture, and an exteriorly exposed glass septum forming a gas-tight closure for the lower end of said cylinder, said septum being readily breakable thereby to facilitate removal and replacement of said starting electrode.

4. A demountable electrode structure comprising a metal header having an aperture therein, an open-ended hollow metal cylinder joined to said header in a region surrounding said aperture and having an external flange at the outer end thereof, a flanged metal thimble having one end projecting into said cylinder, a fillet of glass forming a gas-tight joint between the flanges of said cylinder and said thimble, and an electrode-support mounted on said one end of said thimble.

5. An electric discharge device comprising a sealed envelope, an anode mounted therein, a metal header forming a portion of the wall of said envelope and having an aperture therein, a pool-type cathode comprising a quantity of cathode material in contact with said header, an open-ended hollow metal cylinder joined to said header in a region surrounding the aperture therein, a metal thimble arranged within said cylinder and having one end projecting toward the interior of the envelope, an exteriorly exposed fillet of fusible material forming a gas-tight joint between the outer edges of said thimble and said cylinder, an electrode support mounted on said one end of said thimble and insulated from said cathode material, and a discharge initiating electrode structure supported thereby in cooperative relation with said cathode.

6. In combination, a discharge envelope comprising a metal wall portion having an aperture therein, an open-ended tubular metal member joined to the wall of the envelope in a region surrounding the aperture and projecting externally of the envelope, a hollow metal thimble interfitting within said tubular member and having a closed end which projects toward the interior of the envelope, an exteriorly exposed fillet of sealing material forming a gas-tight joint between the edges of the thimble and the tubular member, and one or more electrodes mounted on the closed end of the thimble and positioned within the interior of the envelope, said electrodes being removable from the envelope through said aperture upon destruction of said joint.

7. In combination, a discharge envelope comprising a metal wall portion having an aperture therein, an open-ended tubular metal member joined to said wall portion in a region surrounding the aperture and projecting externally of the envelope, a metal thimble having a closed end projecting into said cylinder toward the interior of the envelope, an exteriorly exposed fillet of sealing material forming a gas-tight joint between the edges of the thimble and the tubular member, a hollow metal tube sealed into the said closed end of the thimble and being open to the interior of the envelope, said tube having a portion accessible externally of the envelope, and an electrode structure mounted on said hollow tube within the envelope and removable from the envelope through said aperture upon destruction of said joint.

8. In an electric discharge device, a sealed envelope, a metal member forming a portion of the wall of said envelope, a pool type cathode comprising a quantity of cathode material in contact with said member, a hollow metal tube passing through said member, said tube being open to the interior of the envelope and having a portion which projects externally of the envelope, means insulating the tube from the cathode material and an electrode connected to the tube and supported thereby in cooperative relation with the cathode.

9. An electric discharge device comprising a sealed envelope, an anode mounted therein, a metal header forming a portion of the wall of the envelope and having an aperture therein, a pool-type cathode comprising a quantity of cathode material in contact with said header, a starting electrode supported in cooperative relation with the cathode material and insulated therefrom, and common means including an externally exposed frangible member of a sealing material such as glass for closing the header aperture and supporting the starting electrode, the electrode and its mountings being of such dimensions that they may be removed from the envelope through the aperture upon breakage of the frangible member.

10. An electric discharge device comprising a sealed envelope having a metal wall portion with an aperture therein, an open-ended tubular metal member joined to said wall portion in a region surrounding the aperture and projecting externally of the envelope, a hollow metal thimble tightly interfitting within said metal member and having a closed end which projects toward the interior of the envelope, said metal member and said thimble terminating externally in conforming contiguous edges, a body of fused metal constituting a continuous sealed joint between said edges and an electrode mounted on the closed end of the thimble within the interior of the envelope, said electrode being removable through the aperture upon destruction of said sealed joint between the metal member and the thimble.

LAWRENCE D. MILES.